(12) United States Patent
Aoki et al.

(10) Patent No.: US 9,227,671 B2
(45) Date of Patent: Jan. 5, 2016

(54) VEHICLE INSTRUMENT PANEL REINFORCEMENT

(75) Inventors: Takayuki Aoki, Toyota (JP); Masayuki Azuma, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/004,807

(22) PCT Filed: Mar. 22, 2011

(86) PCT No.: PCT/JP2011/056838
§ 371 (c)(1),
(2), (4) Date: Sep. 12, 2013

(87) PCT Pub. No.: WO2012/127626
PCT Pub. Date: Sep. 27, 2012

(65) Prior Publication Data
US 2014/0001792 A1 Jan. 2, 2014

(51) Int. Cl.
*B62D 25/14* (2006.01)
*B62D 25/20* (2006.01)
*B62D 21/15* (2006.01)
(Continued)

(52) U.S. Cl.
CPC ............. *B62D 25/145* (2013.01); *B62D 21/15* (2013.01); *B62D 21/152* (2013.01); *B62D 25/088* (2013.01); *B62D 25/14* (2013.01); *B62D 25/163* (2013.01); *B62D 25/2018* (2013.01)

(58) Field of Classification Search
CPC ............. B62D 21/152; B62D 25/088; B62D 25/2018; B62D 25/14; B62D 25/163; B62D 25/145; B62D 21/15

USPC .................. 296/193.09, 72, 194, 193.02, 70
See application file for complete search history.

(56) References Cited

U.S. PATENT DOCUMENTS

| 5,564,769 | A | 10/1996 | Deneau et al. | |
| 6,582,005 | B2 * | 6/2003 | Takano | 296/70 |

(Continued)

FOREIGN PATENT DOCUMENTS

| DE | 2219333 A1 | 11/1973 |
| JP | S57-50203 A | 3/1982 |

(Continued)

OTHER PUBLICATIONS

Jul. 15, 2014 Office Action issued in Japanese Patent Application No. 2013-505696 (with translation).

*Primary Examiner* — Joseph D Pape
*Assistant Examiner* — Dana Ivey
(74) *Attorney, Agent, or Firm* — Oliff PLC

(57) ABSTRACT

A vehicle instrument panel reinforcement capable of raising ease of vehicle installation is provided. The instrument panel reinforcement is formed with a cross-section profile of square shaped closed cross-section profile from an upper member and a lower member, is disposed along a vehicle width direction at the inside of a vehicle instrument panel. Plural first protruding portions are formed to one end portion of the upper member, and plural first projection portions are formed to another end portion thereof. Similarly, plural second protruding portions are formed to one end portion of the lower member and plural second projection portions are formed to another end portion thereof. The first protruding portions and the second projection portions, and the first projection portions and the second protruding portions, are projection welded together at plural points simultaneously.

6 Claims, 12 Drawing Sheets

(51) Int. Cl.
*B62D 25/08* (2006.01)
*B62D 25/16* (2006.01)

(56) References Cited

U.S. PATENT DOCUMENTS

| | | | |
|---|---|---|---|
| 6,685,259 B1 | 2/2004 | Shimase et al. | |
| 7,053,330 B2 * | 5/2006 | Wang et al. | 219/93 |
| 7,150,489 B2 * | 12/2006 | Yoshida et al. | 296/72 |
| 7,963,589 B2 * | 6/2011 | Baudart | 296/193.02 |
| 2009/0243337 A1 | 10/2009 | Ema et al. | |
| 2013/0076016 A1 | 3/2013 | Aoki | |

FOREIGN PATENT DOCUMENTS

| | | |
|---|---|---|
| JP | A 59-215284 | 12/1984 |
| JP | U 61-175083 | 10/1986 |
| JP | U 63-59773 | 4/1988 |
| JP | U 2-57733 | 4/1990 |
| JP | A 5-238421 | 9/1993 |
| JP | A 9-295160 | 11/1997 |
| JP | H11-78961 A | 3/1999 |
| JP | A 11-192970 | 7/1999 |
| JP | A 2001-71939 | 3/2001 |
| JP | A 2002-347431 | 12/2002 |
| JP | A 2005-212568 | 8/2005 |
| JP | A 2006-143156 | 6/2006 |
| JP | 2007216728 A | 8/2007 |
| JP | 2007-269075 A | 10/2007 |
| JP | A 2008-155812 | 7/2008 |
| WO | 2005028239 A1 | 3/2005 |
| WO | WO 2011/155031 A1 | 12/2011 |

\* cited by examiner

VEHICLE INSTRUMENT PANEL REINFORCEMENT

TECHNICAL FIELD

The present invention relates to a vehicle instrument panel reinforcement.

BACKGROUND ART

Generally a steering column is configured from piping or formed in a pipe shape using sheet material, and is supported through a steering support bracket by an instrument panel reinforcement disposed along the vehicle width direction.

For example, the technology described in Japanese Patent Application Laid-Open (JP-A) No. H05-238421 employs a structure in which flanges are formed in a radiating shape at 90° intervals around an outer peripheral portion of an instrument panel reinforcement configured by a tubular body. The flanges extend along the length direction of the instrument panel reinforcement, and are integrally formed to the tubular body by extruding or drawing aluminum material. Brackets for attaching vehicle installed components are attached to these flanges.

Patent Document 1: JP-A No. H05-238421

DISCLOSURE OF INVENTION

Technical Problem

However, with the technology described above, due to configuring with plural flanges that project out from the outer peripheral portion of the tubular body, the tubular body and the vehicle installed components need to be disposed such that the flanges and the vehicle installed components do not impinge on each other. There are accordingly many limitations placed on vehicle installation. There is accordingly room for improvement on the above technology in this respect.

In consideration of the above issues, an object of the present invention is to obtain a vehicle instrument panel reinforcement capable of improving ease of vehicle installation.

A vehicle instrument panel reinforcement according to a first aspect includes: an instrument panel reinforcement main body that is disposed along a vehicle width direction at the inside of a vehicle instrument panel, and that is formed by employing two members so as to have a cross-section profile of a square shaped closed cross-section profile, with a steering support bracket that supports a steering column fixed to the instrument panel reinforcement main body; and a joint portion formed by projection welding together an end portion of one member configuring the two members and an end portion of the other member.

A vehicle instrument panel reinforcement according to a second aspect is the first aspect, wherein each of the two members is formed with an L-shaped cross-section profile, with the one member disposed at an upper portion of the instrument panel reinforcement main body and the other member disposed at a lower portion of the instrument panel reinforcement main body; a first of the joint portions is configured by projection welding together one end portion of the one member to one end portion of the other member at plural points simultaneously; and a second of the joint portions is configured by projection welding together another end portion of the one member to another end portion of the other member at plural points simultaneously.

A vehicle instrument panel reinforcement according to a third aspect is the first or the second aspect, wherein a welding pitch of the instrument panel reinforcement main body on a driver seat side is set narrower than a welding pitch of the instrument panel reinforcement main body on a front passenger seat side.

A vehicle instrument panel reinforcement of any one according to a fourth aspect is any aspect out of the first to the third aspects, wherein the instrument panel reinforcement main body is disposed such that an upper wall face of the instrument panel reinforcement main body slopes in vehicle side view so as to be parallel to an axial line of the steering column.

A vehicle instrument panel reinforcement according to a fifth aspect is any aspect out of the first to the fourth aspects, wherein the instrument panel reinforcement main body is disposed such that an upper wall face of the instrument panel reinforcement main body slopes in vehicle side view so as to be parallel to an assembly direction of a navigation instrument or an audio device that is attached to the instrument panel.

A vehicle instrument panel reinforcement according to a sixth aspect is any aspect out of the second to the fifth aspects, wherein a wiring harness is laid out on a rear wall face of the instrument panel reinforcement main body at a driver seat side, and the wiring harness is laid out on an upper wall face of the instrument panel reinforcement main body on a front passenger seat side.

A vehicle instrument panel reinforcement according to a seventh aspect is any aspect out of the first to the sixth aspects, wherein an upper end portion of a brace member whose lower end portion is fixed to a vehicle floor or a lower portion of a front pillar is fixed to a rear portion of the steering support bracket.

According to the first aspect, the steering support bracket is fixed to the instrument panel reinforcement main body and the steering column is supported by the steering support bracket.

In the present aspect, the instrument panel reinforcement main body is formed by employing two members so as to have a cross-section profile of a square shaped closed cross-section profile, and the joint portion is formed by projection welding together the end portion of one member configuring the two members and the end portion of the other member. There are accordingly none of the plural flanges, that are provided so as to project out in conventional technology, at the outer peripheral portion of the instrument panel reinforcement main body formed so as to have a square shaped cross-section profile. The degrees of freedom for disposing the instrument panel reinforcement main body are accordingly raised, improving the ease of vehicle installation.

According to the second aspect, each of the two members configuring the instrument panel reinforcement main body is formed with an L-shaped cross-section profile. The one member is disposed at an upper portion of the instrument panel reinforcement main body and the other member is disposed at a lower portion of the instrument panel reinforcement main body. In this state, the first joint portion is formed by projection welding together one end portion of the one member to one end portion of the other member at plural points simultaneously. The second joint portion is configured by projection welding together another end portion of the one member to another end portion of the other member at plural points simultaneously. Due to joining the first joint portion and the second joint portion in this manner by at plural points simultaneously, the welding process can be significantly shortened in comparison to spot welding in which a pair of electrodes are placed on either side of a flange for each spot point.

According to the third aspect, the welding pitch of the instrument panel reinforcement main body on a driver seat side is set narrower than the welding pitch of the instrument panel reinforcement main body on a front passenger seat side. This accordingly enables a higher strength and rigidity of the cross-section to be achieved on the driver seat side where the heavy steering column is supported than on the front passenger seat side.

Moreover, there is generally an upper limit to the current value when employing welding equipment used, and since a current value required for each point of projection welding is also determined, the number of weld points that it is possible to projection weld at the same time is also self-determined. It is conceivable that by the setting weld points with an even pitch based on the length of the instrument panel reinforcement then cross-section opening up might occur where there is insufficient weld strength when input with a large collision load to the driver seat side such as during an offset collision. However, in the present exemplary embodiment, the welding pitch on the driver seat side is set narrower than the welding pitch on the front passenger seat side, and so the cross-section strength and rigidity is comparatively higher on the driver seat side than on the front passenger seat side. Accordingly, such opening deformation does not readily occur.

According to the fourth aspect, the instrument panel reinforcement main body is disposed such that the upper wall face of the instrument panel reinforcement main body in vehicle side view is parallel to an axial line of the steering column, thereby enabling efficient use to be made of the confined space inside the instrument panel, and also enabling the instrument panel reinforcement main body to be disposed lower along the axial direction of the steering column.

Moreover, often the steering column is fixed to the instrument panel reinforcement through a steering support bracket of U-shaped cross-section that opens downwards, however by adopting the placements relationships described above, since in vehicle side view there is no plate fold point formed between the attachment face of the steering support bracket to the instrument panel reinforcement main body and the attachment face of the steering support bracket to the steering column, both these attachment faces may be disposed on a straight line. It is consequently possible to manufacture the steering support bracket simply by press forming.

According to the fifth aspect, since in vehicle side view the upper wall face of the instrument panel reinforcement main body is disposed parallel to the assembly direction of a navigation instrument or an audio device, efficient utilization can be made of the confined space inside the instrument panel.

According to the sixth aspect, the upper member configuring the instrument panel reinforcement main body is disposed at the upper portion of the instrument panel reinforcement main body described above. A wiring harness is laid out on a rear wall face of an upper member on the driver seat side, and the wiring harness is laid out on the upper wall face of the upper member on a front passenger seat side. Namely, the wiring harness crosses over the connection location between the rear wall face and the upper wall face of the upper member partway through laying out from the driver seat side to the front passenger seat side.

Thus in the present exemplary embodiment, due to the upper member being formed with an L-shaped cross-section profile, there is no flange or edge that projects out at the connection location between the rear wall face and the upper wall face thereof.

According to the seventh aspect, due to the upper end portion of a brace member whose lower end portion is fixed to the vehicle floor or the lower portion of the front pillar being fixed to the rear portion of the steering support bracket, up-down direction vibration of the steering column occurring during vehicle travelling can be supported by axial force of the brace member.

Advantageous Effects of Invention

As explained above, the vehicle instrument panel reinforcement according to the first aspect exhibits the excellent advantageous effect of enabling the ease of vehicle installation to be improved.

The vehicle instrument panel reinforcement according to the second aspect exhibits the excellent advantageous effect of enabling a dramatic improvement in productivity, and hence enabling a large reduction in cost to be achieved.

The vehicle instrument panel reinforcement according to the third aspect efficiently distributes the limited number of projection welding spots, and thereby exhibits the excellent advantageous effect of enabling the heavy steering column to be supported in a stable state, and enabling opening up of the instrument panel reinforcement main body to be suppressed or prevented when a collision load is input.

The vehicle instrument panel reinforcement according to the fourth aspect exhibits the excellent advantageous effects of enabling the space utilization efficiency to be raised inside the instrument panel, and enabling a cost reduction to be achieved through facilitating manufacture of the steering support bracket.

The vehicle instrument panel reinforcement according to the fifth aspect exhibits the excellent advantageous effect of enabling the space utilization efficiency to be raised inside the instrument panel.

The vehicle instrument panel reinforcement according to the sixth aspect exhibits the excellent advantageous effect of enabling damage to the wiring harness from the instrument panel reinforcement main body to be suppressed or prevented.

The vehicle instrument panel reinforcement according to the seventh aspect exhibits the excellent advantageous effect of enabling the strength (plate thickness) of the instrument panel reinforcement main body to be lowered, thereby achieving a reduction in vehicle weight and a reduction in cost.

BEST MODE FOR CARRYING OUT THE INVENTION

Figure 1:
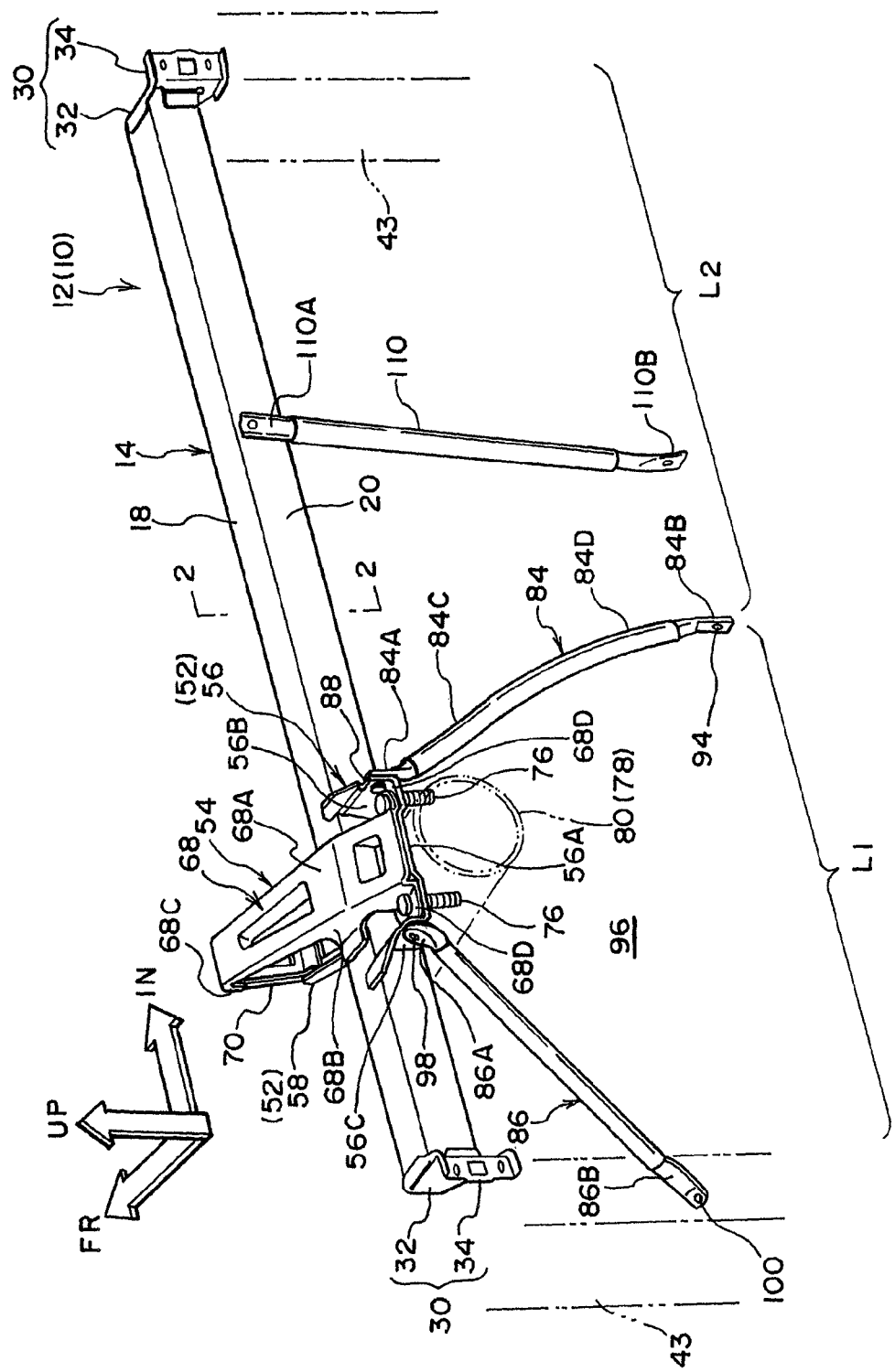
FIG. 1 is a perspective view of an assembled state of a vehicle instrument panel reinforcement according to the present exemplary embodiment.

Explanation follows regarding an exemplary embodiment of a vehicle instrument panel reinforcement according to the present invention, with reference to FIG. 1 to FIG. 13. Note that in the drawings, the arrow FR indicates the vehicle front side, the arrow UP indicates the vehicle upper side, and the arrow IN indicates the vehicle width direction inside, as appropriate.

Detailed Structure of Instrument Panel Reinforcement 10

Figure 2:
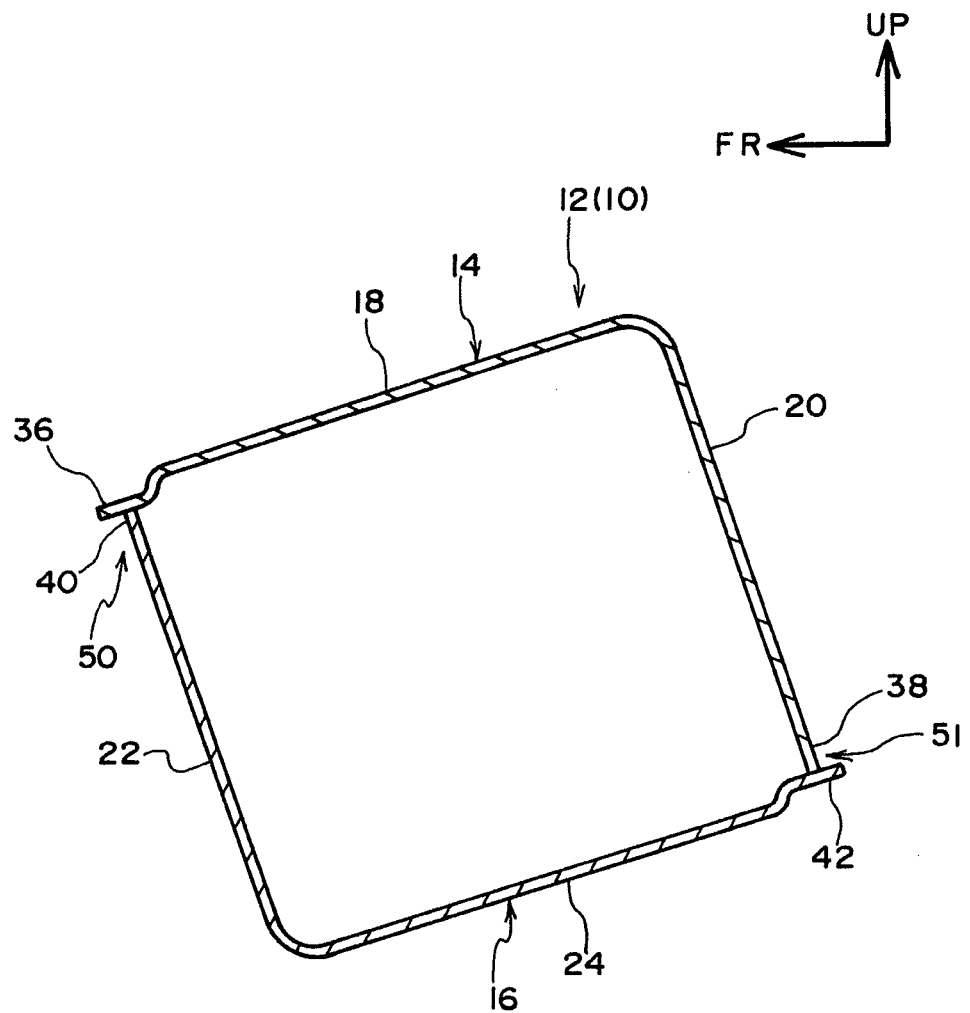
FIG. 2 is an enlarged cross-section taken on line 2-2 of the instrument panel reinforcement illustrated in FIG. 1.
Figure 3:
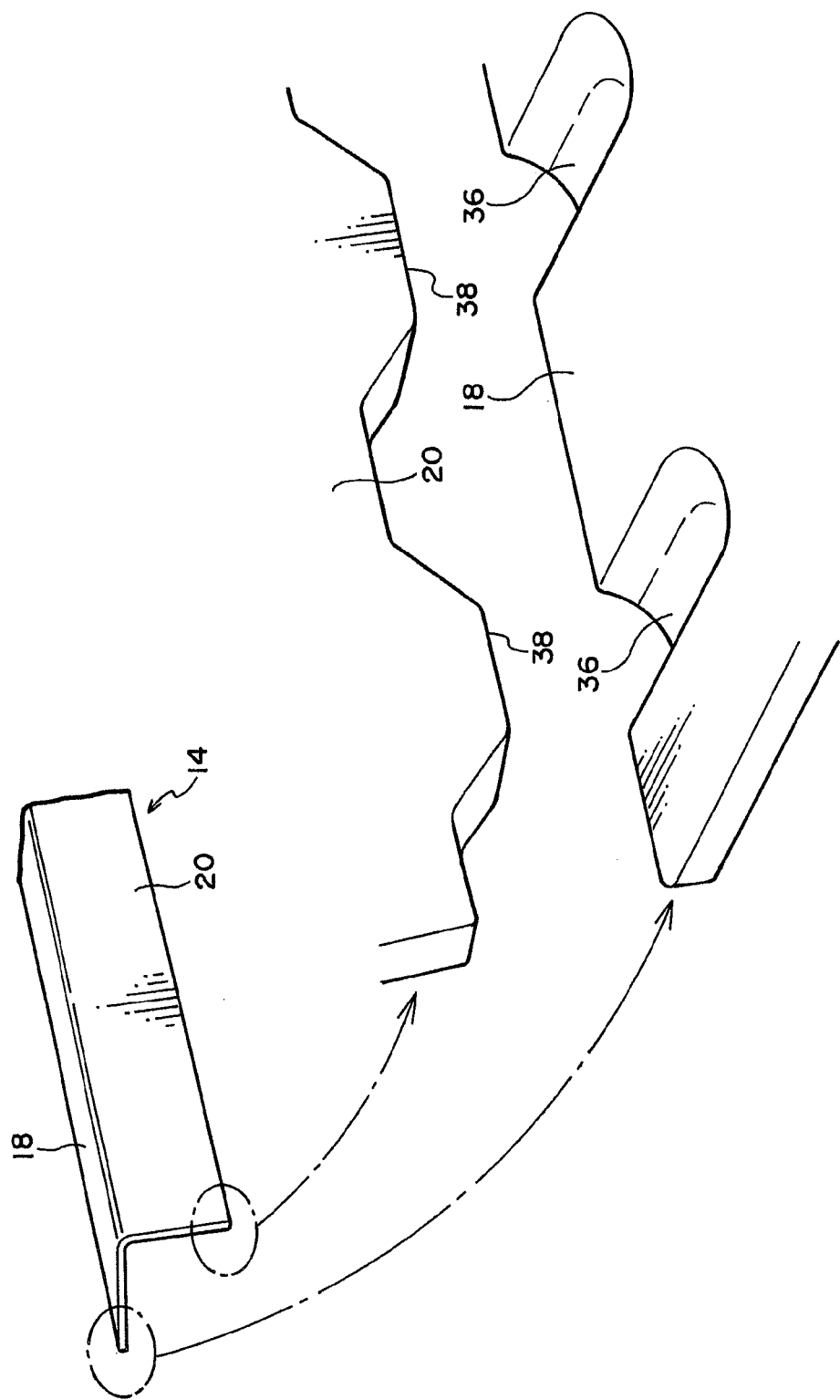
FIG. 3 is an enlarged perspective view of relevant portions illustrating an enlargement of protruding portions and projection portions for projection welding as an example of an upper member.

FIG. 1 illustrates a perspective view of an assembled state of an instrument panel reinforcement, and FIG. 2 illustrates a vertical cross-section of the instrument panel reinforcement. As illustrated in these drawings, the instrument panel reinforcement 10 is configured as a square shaped cross-section press structural body 12 that is divided into two along a diagonal. Note that the press structural body 12 corresponds to the "instrument panel reinforcement body" of the present invention. Specifically, the press structural body 12 is configured from two components that are each configured by press forming into an L-shaped cross-sectional profile, these being an upper member 14 serving as one member and a lower member 16 serving as another member.

The upper member 14 is configured on the upper side of the square shaped cross-section, and is equipped with an upper face section 18 that is disposed facing substantially towards the vehicle front side, and a rear face section 20 that is disposed facing substantially towards the vehicle bottom side. The lower member 16 is configured on the lower side of the square shaped cross-section, and is equipped with a front face section 22 that is disposed facing substantially towards the vehicle upper side, and a bottom face section 24 that is disposed facing substantially towards the vehicle rear side.

As illustrated in FIG. 2 to FIG. 6B, plural first protruding portions 36 are integrally formed at a specific pitch on a front end portion of the upper face section 18 of the upper member 14 (one end portion of the one member). Each of the first protruding portions 36 is formed by the front end portion of the upper member 14 bulging out in the plate thickness direction in a semi-circular cylindrical shape towards the lower member 16 side. Plural first projection portions 38 are also integrally formed at a specific pitch on a bottom end portion of the rear face portion 20 (another end portion of the one member). The first projection portions 38 are formed in equilateral trapezoidal shapes that extend out towards the vehicle bottom side along the rear face section 20. Note that the first protruding portions 36 and the first projection portions 38 are formed at the same time as press forming the upper member 14.

Plural second projection portions 40 are integrally formed to an upper end portion of the front face section 22 of the lower member 16 (an end portion of the other member), at the same pitch as the first protruding portions 36 formed to the upper member 14. The second projection portions 40 are formed along the front face section 22 in equilateral trapezoidal shapes that are similar in shape to the first projection portions 38 and extend towards the vehicle upper side. Plural second protruding portions 42 are integrally formed at the same pitch as the first projection portions 38 to a rear end portion of the bottom face section 24 (other end portion of the other member). Each of the second protruding portions 42 is formed by the rear end portion of the lower member 16 bulging out in the plate thickness direction in a semi-circular cylindrical shape towards the upper member 14 side. Note that the second protruding portions 42 and the second projection portions 40 are formed at the same time as press forming the lower member 16.

Figure 5:
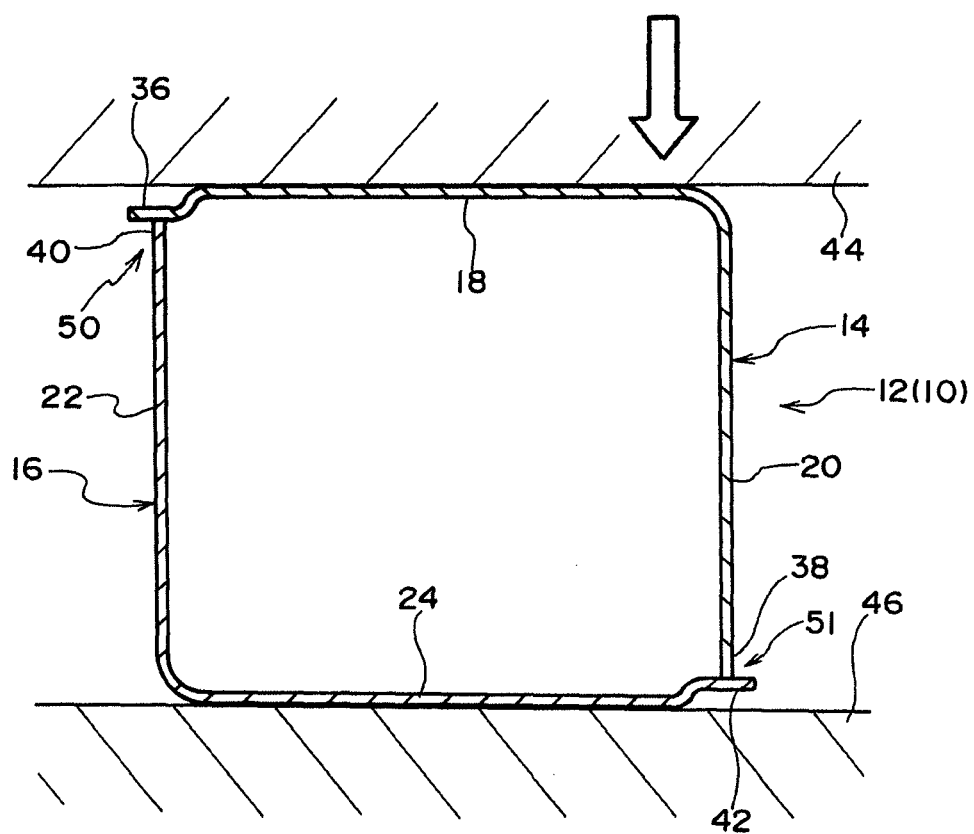
FIG. 5 is a cross-section corresponding to FIG. 2 and illustrating an arrangement when projection welding together an upper member and a lower member.

The upper member 14 and the lower member 16 are, as illustrated in FIG. 5, disposed with the upper member 14 and the lower member 16 set between an upper former 44 and a lower former 46, with the first protruding portions 36 formed to the upper face section 18 of the upper member 14 pressed against the second projection portions 40 of the front face section 22 of the lower member 16, and with the first projection portions 38 formed to the rear face section 20 of the upper member 14 are pressed against the second protruding portions 42 formed to the bottom face section 24 of the lower member 16. Contact locations between the first protruding portions 36 and the first projection portions 38 and contact locations between the second protruding portions 42 and the second projection portions 40 are then melted by passing a specific current through, so as to weld at plural points simultaneously. Namely, the press structural body 12 of the present exemplary embodiment is manufactured by multi-point simultaneous projection welding.

Figure 4:
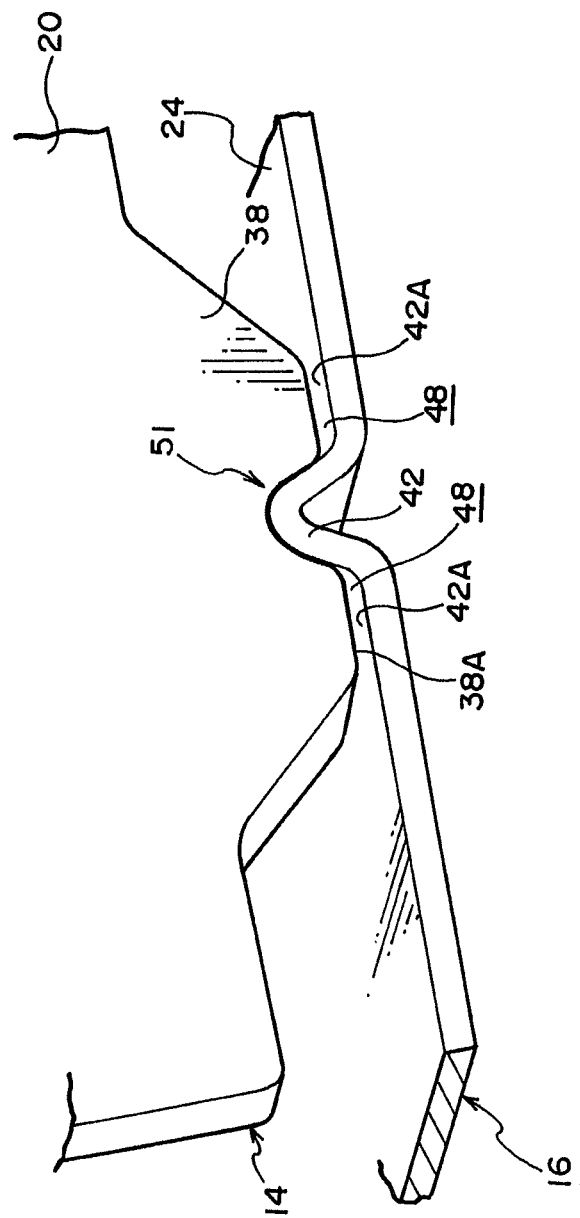
FIG. 4 is an enlarged perspective view of relevant portions illustrating a joined state of a first projection portion and a second protruding portion that have been projection welded.

In the following, the joint portion between the first protruding portions 36 and the second projection portions 40 is referred to in general as "front side joint portion 50" and the joint portion between the first projection portions 38 and the second protruding portions 42 is referred to in general as "rear side joint portion 51". Note that as illustrated in FIG. 4, in a state in which the second protruding portions 42 and the first projection portions 38 have been projection welded together, there are set gaps 48 formed between the leading end faces 38A of the first projection portions 38 and adjacent faces 42A of the second protruding portions 42. This point also applies to the first protruding portions 36 and the first projection portions 38.

Figure 6A:
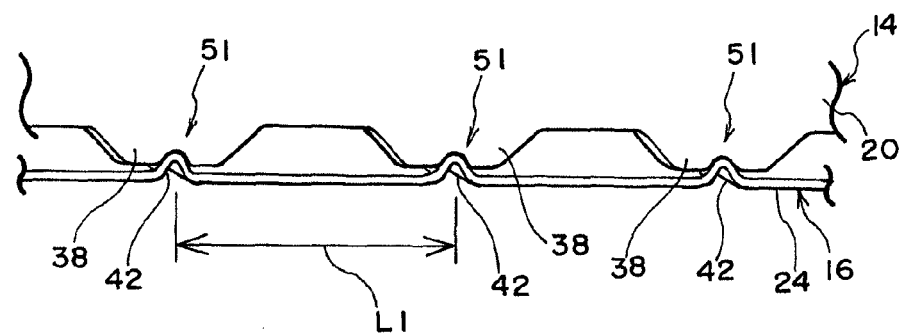
FIG. 6A is a partial expanded perspective view illustrating a pitch of protruding portions and projection portions for projection welding on the driver seat side.
Figure 6B:
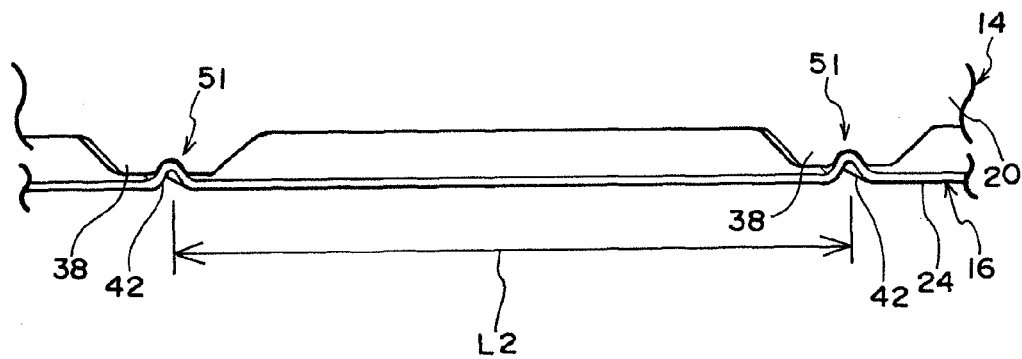
FIG. 6B is a partial expanded perspective view illustrating a pitch of protruding portions and projection portions for projection welding on the front passenger seat side.

Moreover, as illustrated in FIG. 6A, a formation pitch L1 on the driver seat side of the protruding portions and the projection portions (the first protruding portions 36 and the first projection portions 38, and the second protruding portions 42 and the second projection portions 40) is, as illustrated in FIG. 6B, set narrower than a formation pitch L2 of the protruding portions and the projection portions (as above) on the front passenger seat side. Note that FIG. 1 also illustrates the range over which projection welding is performed at the pitch L1 and the range over which projection welding is performed at the pitch L2.

Attachment Structure of the Instrument Panel Reinforcement 10 to the Vehicle Body Returning to FIG. 1, attachment brackets 30 formed in L-shapes in plan view are respectively attached to the two length direction end portions of the press structural body 12 described above. Each of the attachment brackets 30 is manufactured by press forming. The attachment brackets 30 are equipped with a base portion 32 that closes off the square cross-section formed at the length direction end portions of the press structural body 12, and an attachment portion 34 that is formed by bending over the rear end portion of the base portion 32 towards the vehicle width direction outside. The attachment portions 34 are fastened and fixed respectively to rear wall portions of a pair of left-right front pillars 43. The instrument panel reinforcement 10 accordingly spans across between the left-right front pillars 43.

Steering Support Bracket 52 and Cowling Top Brace 54

A steering support bracket 52 and a cowling top brace 54 are attached to the driver seat side of the instrument panel reinforcement 10. The steering support bracket 52 is configured only at the lower side. Namely, the upper side of the steering support bracket 52 is dispensed with. Specifically, the steering support bracket 52 is configured by a first support member 56 fixed to the upper member 14 side of the press structural body 12, and a second support member 58 fixed to the lower member 16 side of the press structural body 12. Both the first support member 56 and the second support member 58 are formed by press forming.

The first support member 56 is formed in a substantially U-shape that is open towards the vehicle upper side, and is equipped with a bottom portion 56A that extends along the vehicle width direction, and two side portions 56B, 56C formed by bending the vehicle width direction two end portions of the bottom portion 56A towards the vehicle upper side. The two sides of the bottom portion 56A are formed one step lower than the central portion of the bottom portion 56A and are each formed with a left-right pair of bolt through holes (not illustrated in the drawings). The upper end portions of the two side portions 56B, 56C are respectively bent around in the direction away from each other, extend out towards the vehicle front side and are spot welded to the upper face section 18 of the upper member 14.

The cowling top brace 54 is configured by an upper portion 68 formed in an inverted V-shape in side view disposed so as to straddle the press structural body 12 from the vehicle upper side, and a lower portion 70 disposed at the vehicle front side of the press structural body 12 so as to project down towards the vehicle bottom side from the front end portion of the upper portion 68. The upper portion 68 and the lower portion 70 are both manufactured by press forming.

The upper portion 68 is formed with an inverted U-shaped cross-section profile that is open towards the vehicle bottom side and is equipped with a main body portion 68A that is formed with a substantially rectangular profile in plan view, and two side portions 68B that are formed by bending the vehicle width direction two end portions of the main body portion 68A towards the vehicle bottom side. A front end portion 68C of the main body portion 68A is bend around towards the vehicle bottom side, and is fastened and fixed with a bolt (not illustrated in the drawings) to the cowling. The rear end portions of the two side portions 68B are bent around in the direction separating from each other to configure a pair of attachment flanges 68D. The pair of attachment flanges 68D are superimposed on the top face of two sides of the bottom portion 56A of the first support member 56 described above. An attachment bolt 76 is fixed to each of the attachment flanges 68D so as to face downwards. The attachment bolts 76 are inserted through inside bolt insertion holes formed in both sides of the bottom portion 56A of the first support member 56, and are also fastened and fixed to a column-side attachment bracket fixed to a column tube 80 of a steering column 78.

The lower portion 70 is formed with a substantially equilateral triangular shaped profile as viewed from the vehicle front side. Each side of the lower portion 70 bends around towards the vehicle rear side as reinforcement. Similarly to the attachment bolts 76 described above, there are also a left-right pair of attachment bolts 76 that face downwards and project out from the leading end portion of the lower portion 70, and pass through a front portion of the second support member 58 so as to be fastened and fixed to the column-side attachment bracket. The column tube 80 of the steering column 78 is accordingly fastened and fixed to the first support member 56 and the second support member 58.

Floor Brace 84 and Steering Brace 86 and Front Passenger Seat Floor Brace 110 A floor brace 84 and a steering brace 86 are also each attached as bracing members to the first support member 56 of the steering support bracket 52 described above so as to sandwich the first support member 56 along the vehicle width direction.

The floor brace 84 is configured by piping, and an upper end portion 84A and a lower end portion 84B thereof are squashed so as to facilitate fixing. The floor brace 84 is formed with a curved profile at an up-down direction intermediate portion as viewed from inside the vehicle cabin. Specifically, the floor brace 84 is configured by an upper portion 84C that extends from the upper end portion 84A to an up-down direction intermediate portion, and a lower portion 84D that extends from the up-down direction intermediate portion to the lower end portion 84B. The upper end portion 84A is fastened and fixed to the side portion 56B at the vehicle width direction inside of the first support member 56 by a fastening 88 configured by a bolt and weld nut. The lower end portion 84B is fastened and fixed to a side wall portion of a floor tunnel section, that is provided in a saddle shape at a vehicle width direction central portion of a vehicle body floor 90 (see FIG. 8), using a fastener 94 configured from a bolt and a weld nut. The upper portion 84C also slopes towards the vehicle width direction outside with respect to the lower portion 84D. A pedal work space 96 is secured thereby.

The steering brace 86 is configured by piping, and an upper end portion 86A and a lower end portion 86B thereof are squashed to facilitate fixing. The steering brace 86 is formed with a straight line profile. The upper end portion 86A is fastened and fixed to the side portion 56C on the vehicle width direction outside of the first support member 56 with a fastening 98 configured by a bolt and weld nut. The lower end portion 86B is fastened and fixed to a height direction intermediate portion of the front pillar 43 with a fastening 100 configured by a bolt and weld nut. As a result the steering brace 86 slopes such that the position of the upper end portion 86A is higher than the position of the lower end portion 86B as viewed from the vehicle cabin inside.

A front passenger seat floor brace 110 is also disposed on the front passenger seat side of the instrument panel reinforcement 10 described above. The front passenger seat floor brace 110 is formed with a straight line profile and an upper end portion 110A thereof is fastened and fixed to the rear face portion 20 of the upper member 14. A lower end portion 110B of the front passenger seat floor brace 110 is fastened and fixed to a side wall portion on the front passenger seat side of the floor tunnel section, not illustrated in the drawings.

Peripheral Component Housing of the Instrument Panel Reinforcement 10

Figure 7:
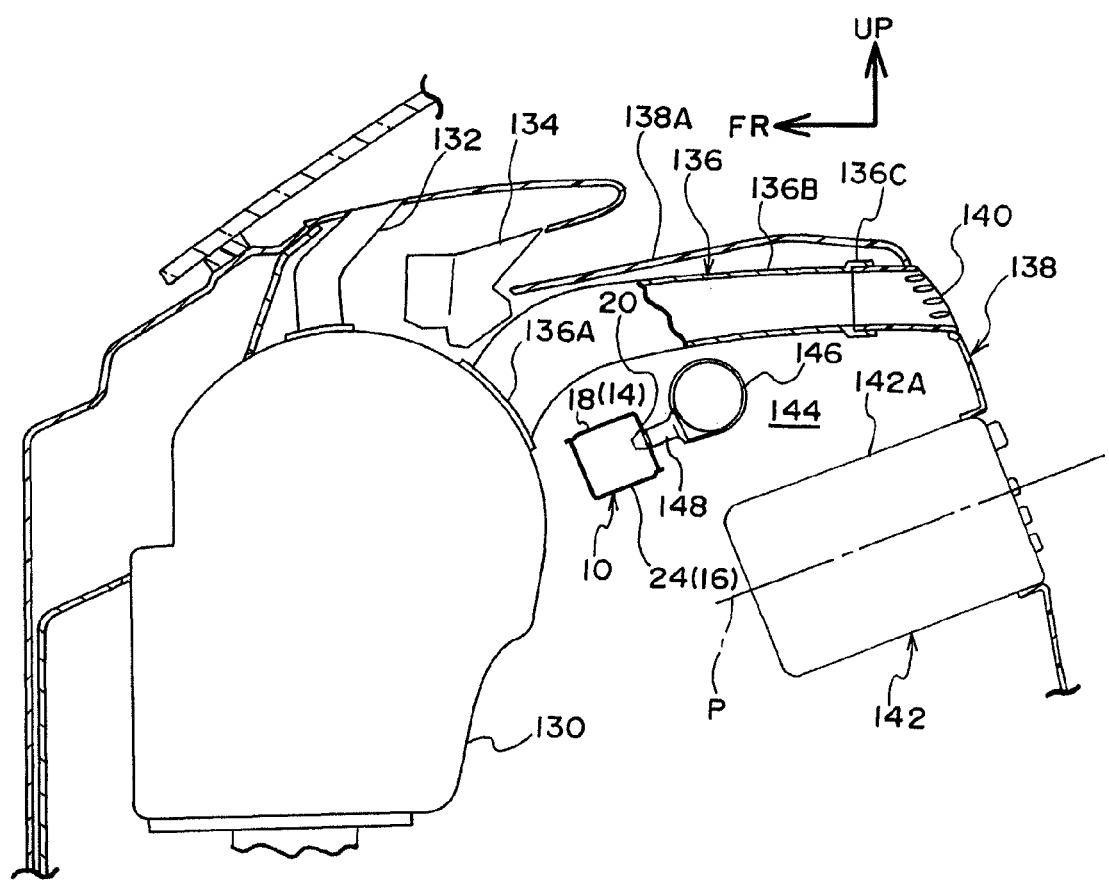
FIG. 7 is a vertical cross-section of an assembled state at the center of a vehicle instrument panel reinforcement according to the present exemplary embodiment.

FIG. 7 schematically illustrates housing at a center cross-section. As illustrated in this drawing, a heating and ventilating air condition (HVAC) 130 is disposed at the vehicle front side of a center cross-section of the instrument panel reinforcement 10. A lower end portion of a defroster 132 is connected at the center side of an upper portion of the HVAC 130. A center meter 134 is disposed at the vehicle rear side of the defroster 132. A front end portion 136A of a center duct 136 is connected to a rear end side of the upper portion of the HVAC 130. An intermediate portion 136B of the center duct 136 extends along the vehicle front-rear direction below an upper face portion 138A of an instrument panel 138 so as not to get in the way of the center meter 134. Moreover, a blower outlet 140 provided to the instrument panel 138 is connected to a rear end portion 136C of the center duct 136.

At the center cross-section, a substantially rectangular box shaped navigation instrument 142 is provided parallel to, and at the vehicle lower side of, the center duct 136 described above. The orientation of the navigation instrument 142 is set so as to deviate by 30° or less from an eye point direction, not illustrated in the drawings. Note that the orientation of the navigation instrument 142 is indicated by the broken line P. The instrument panel reinforcement 10 is disposed with the same orientation thereto in a space 144 between the center duct 136 and an upper face 142A of the navigation instrument 142. Namely, the orientation of the instrument panel reinforcement 10 about its axis is determined such that the upper face section 18 of the upper member 14 of the instrument panel reinforcement 10 is substantially parallel to the upper face 142A of the navigation instrument 142.

Figure 8:
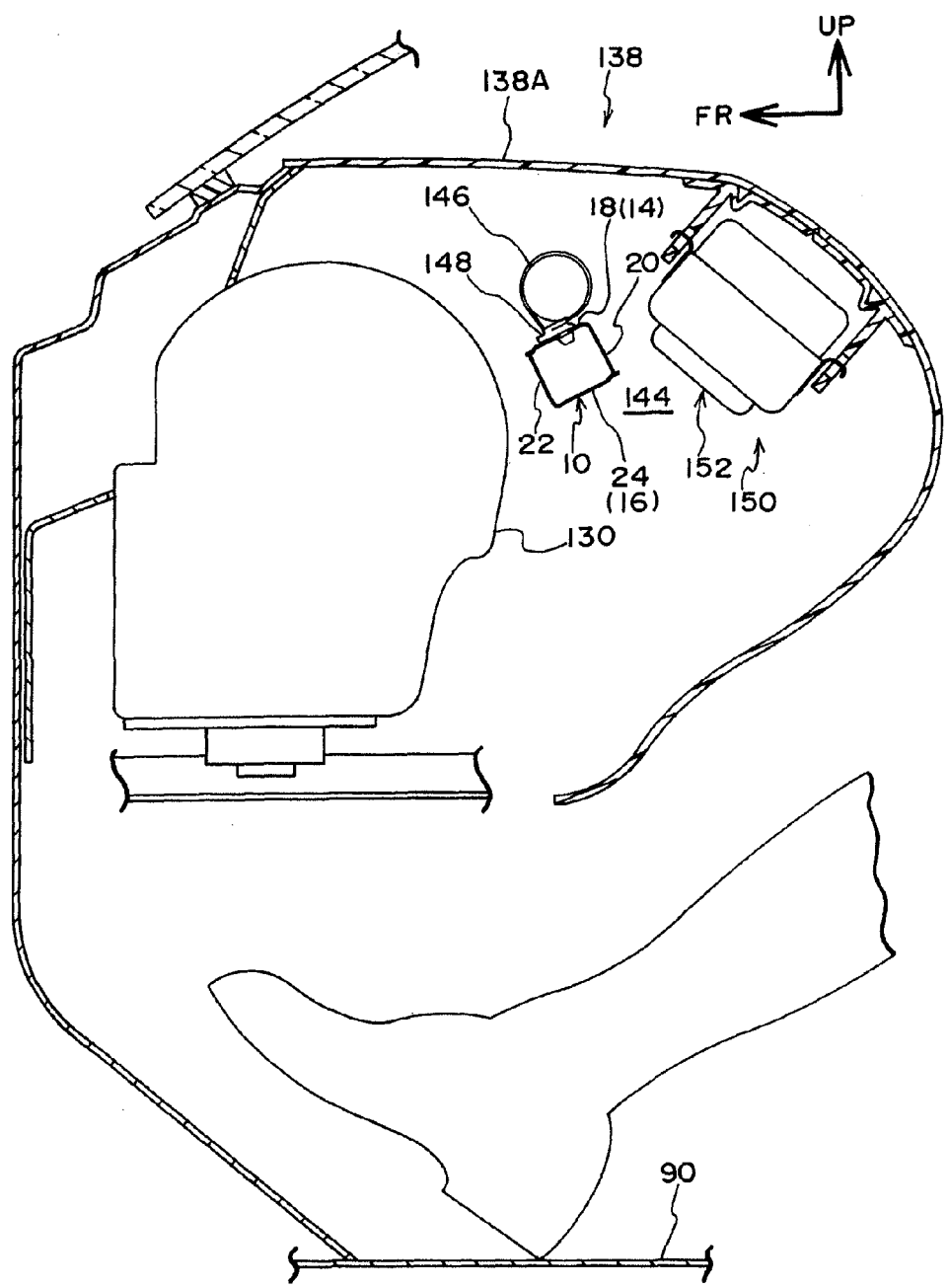
FIG. 8 is a vertical cross-section of an assembled state at the front passenger seat side of a vehicle instrument panel reinforcement according to the present exemplary embodiment.

Moreover, a wiring harness 146 is fixed with clips 148 to the rear face portion 20 of the upper member 14 of the instrument panel reinforcement 10. On the driver seat side the wiring harness 146 is laid out on the rear face portion 20 of the upper member 14 of the instrument panel reinforcement 10, however, as illustrated in FIG. 8, the wiring harness 146 is laid out on the upper face section 18 of the upper member 14 on the front passenger seat side. Namely, the wiring harness 146 is laid out along the rear face portion 20 of the upper member 14 at the driver seat side, and straddles the boundary portion (corner portion) between the rear face portion 20 and the upper face section 18 on transition from the driver seat side to the front passenger seat side, so as to be laid out along the upper face section 18 of the upper member 14 on the front passenger seat side.

Moreover, a mid-mount type front passenger seat airbag device 150 is disposed at the front passenger seat side of the instrument panel 138. In other words, a structure is adopted in which on the driver seat side the wiring harness 146 is laid out along the rear face portion 20 in order to allow the center duct 136 to pass through at the vehicle upper side of the instrument panel reinforcement 10, however at the front passenger seat side cross-section, the wiring harness 146 is laid out along the upper face section 18 since an airbag module 152 of the mid-mount type front passenger seat airbag device 150 is present at the vehicle rear side of the instrument panel reinforcement 10.

Relationship Between the Orientation of the Instrument Panel Reinforcement 10 and the Steering Column 78

Figure 9:
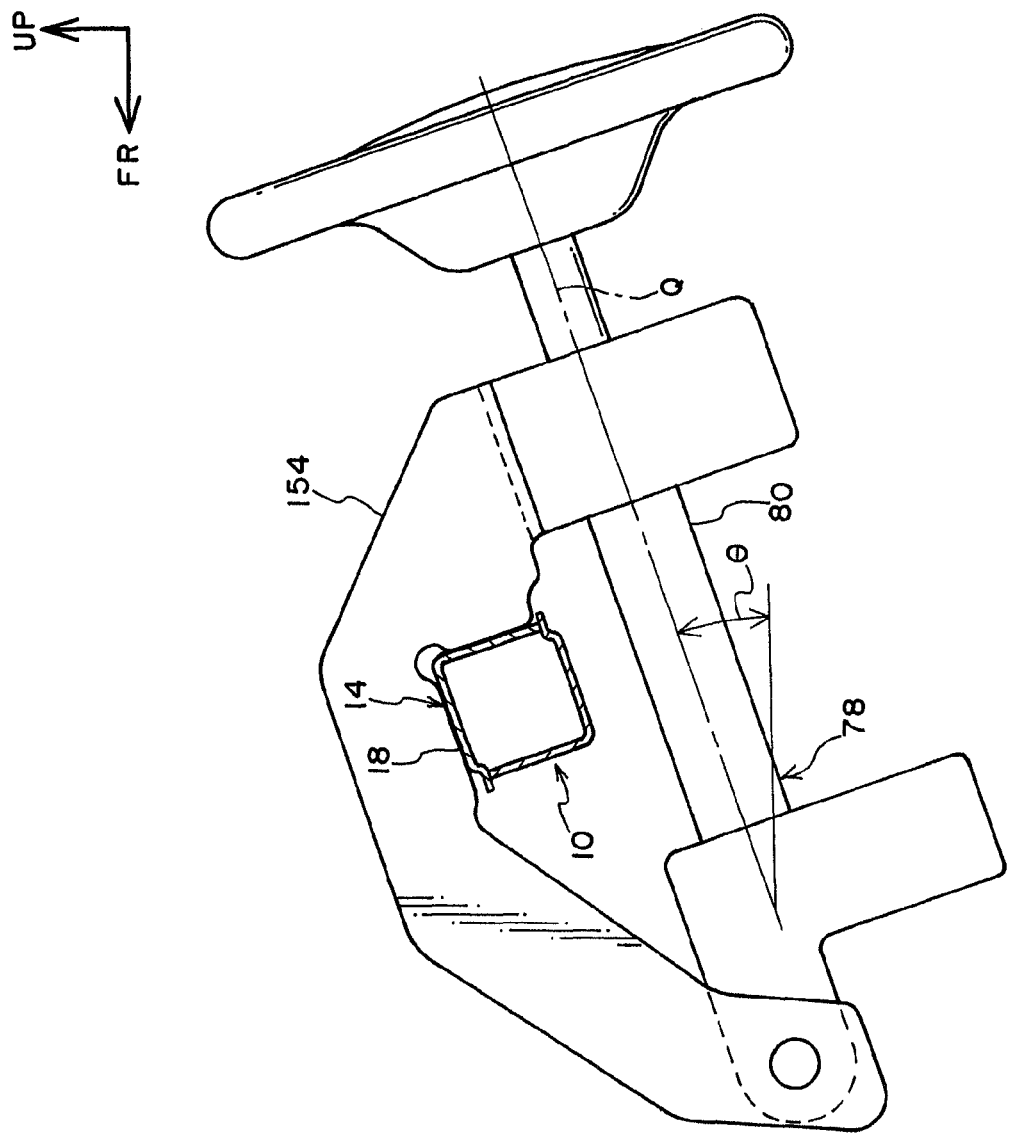
FIG. 9 is a schematic side view illustrating a positional relationship between a steering column and an instrument panel reinforcement.

Moreover, as illustrated in FIG. 9, the steering column 78 is set such that a slope angle θ of its axial line Q is 20° to 22° to the horizontal. In the present exemplary embodiment, the orientation of the instrument panel reinforcement 10 about its axis is set such that the upper face section 18 of the instrument panel reinforcement 10 is substantially parallel to the axial line Q of the steering column 78. Note that in FIG. 9, the member disposed so as to straddle the instrument panel reinforcement 10 is the schematically illustrated steering support member 154.

Operation and Advantageous Effects of the Present Exemplary Embodiment Explanation next follows regarding the operation and advantageous effects of the present exemplary embodiment.

According to the present exemplary embodiment, the steering support bracket 52 is fixed to the driver seat side of the instrument panel reinforcement 10, and the steering column 78 is supported by the steering support bracket 52.

In the present exemplary embodiment, the press structural body 12 of the instrument panel reinforcement 10 employs two members such that the cross-section profile forms a square closed cross-section, with the front side joint portion 50 and the rear side joint portion 51 formed by projection welding the end portions of the upper member 14 to the end portions of the lower member 16 that configure the two members. Accordingly, there are none of the plural flanges, that are provided so as to project out in conventional technology, at the outer peripheral portion of the press structural body 12 of the instrument panel reinforcement 10 formed so as to form the square shaped closed cross-section. The degrees of freedom for disposing the instrument panel reinforcement 10 are accordingly raised, enabling the ease of vehicle installation to be raised.

Moreover, according to the present exemplary embodiment, the upper member 14 and the lower member 16 configuring the press structural body 12 of the instrument panel reinforcement 10 are both formed with L-shaped cross-section profiles. The upper member 14 is disposed at the upper portion of the instrument panel reinforcement 10, and the lower member 16 is disposed at the lower portion of the instrument panel reinforcement 10. In this state the front side joint portion 50 is formed by multi-point simultaneous projection welding together of the first protruding portions 36 of the upper member 14 and the second projection portions 40 of the lower member 16. Moreover, the rear side joint portion 51 is formed by multi-point simultaneous projection welding of the first projection portions 38 of the upper member 14 to the second protruding portions 42 of the lower member 16. Due to forming the front side joint portion 50 and the rear side joint portion 51 by multi-point simultaneous projection welding in this manner, the welding process is significantly shortened compared to spot welding by placing a pair of electrodes on either side of a flange for each spot position. As a result the present exemplary embodiment enables the ease of manufacture to be dramatically improved, thereby enabling a large reduction in cost to be achieved.

Moreover, according to the present exemplary embodiment, as illustrated in FIG. 6A and FIG. 6B, due to setting the welding pitch L1 of the instrument panel reinforcement 10 on the driver seat side narrower than the welding pitch L2 of the instrument panel reinforcement 10 on the front passenger seat side, the strength and rigidity of the cross-section can be raised on the driver seat side compared to the front passenger seat side so as to support the heavy steering column 78.

Figure 10:
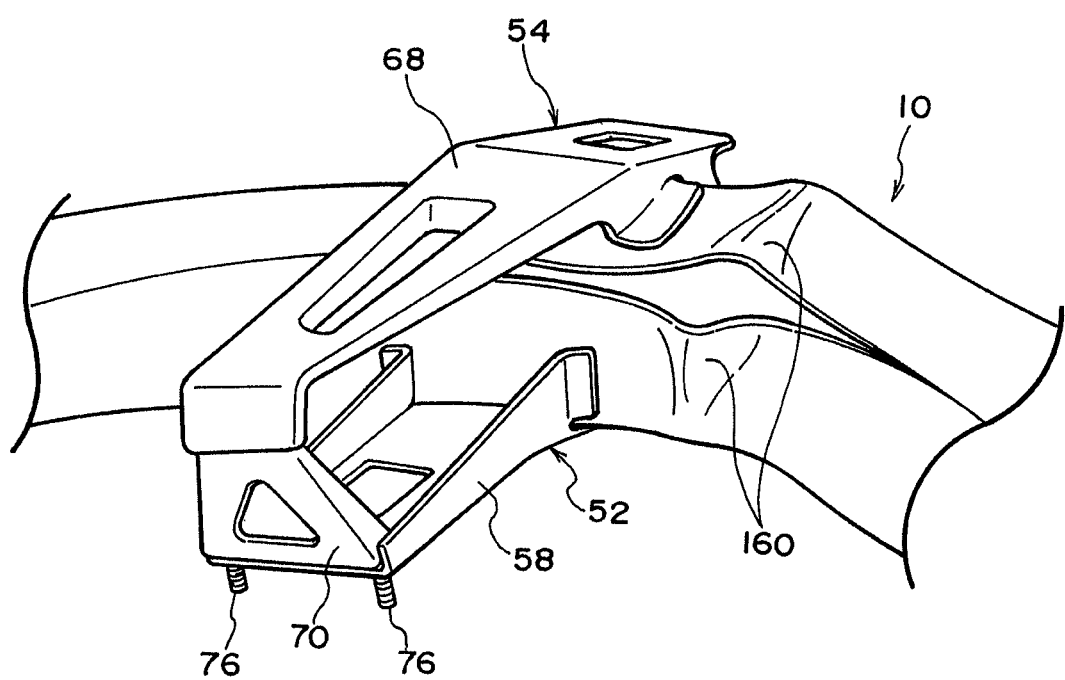
FIG. 10 is an explanatory diagram to explain an advantageous effect of a vehicle instrument panel reinforcement according to the present exemplary embodiment, and is a perspective view of the instrument panel reinforcement as viewed from the vehicle rear side.

Moreover, generally there is an upper limit to the current value when employing welding equipment, and since a current value required for each point of projection welding is also determined, the number of weld points that it is possible to projection weld at the same time is also self-determined. It is conceivable that by the setting weld points with an even pitch based on the length of the instrument panel reinforcement 10 then, as illustrated in FIG. 10, cross-section opening up (illustrated with the annotation "160" at locations where opening deformation has occurred) might occur where there is insufficient weld strength when input with a large collision load to the driver seat side, such as during an offset collision. However, in the present exemplary embodiment, the welding pitch L1 on the driver seat side is set narrower than the welding pitch L2 on the front passenger seat side, and so the cross-section strength and rigidity is comparatively higher on the driver seat side than on the front passenger seat side. Such opening deformation thereby does not readily occur.

Thus in the vehicle instrument panel reinforcement according to the present exemplary embodiment, due to disposing the limited number of projection welding points efficiently, the heavy steering column 78 can be supported in a stable state and opening up of the press structural body 12 of the instrument panel reinforcement 10 can be suppressed or prevented when input with a collision load.

Moreover, in the present exemplary embodiment, due to the upper face section 18 of the upper member 14 of the instrument panel reinforcement 10 being disposed substantially parallel with respect to the axial line Q of the steering column 78 in vehicle side view, the confined space within the instrument panel 138 can be efficiently used, and the instrument panel reinforcement 10 can be disposed lower down along the axial direction of the steering column 78.

Figure 11:
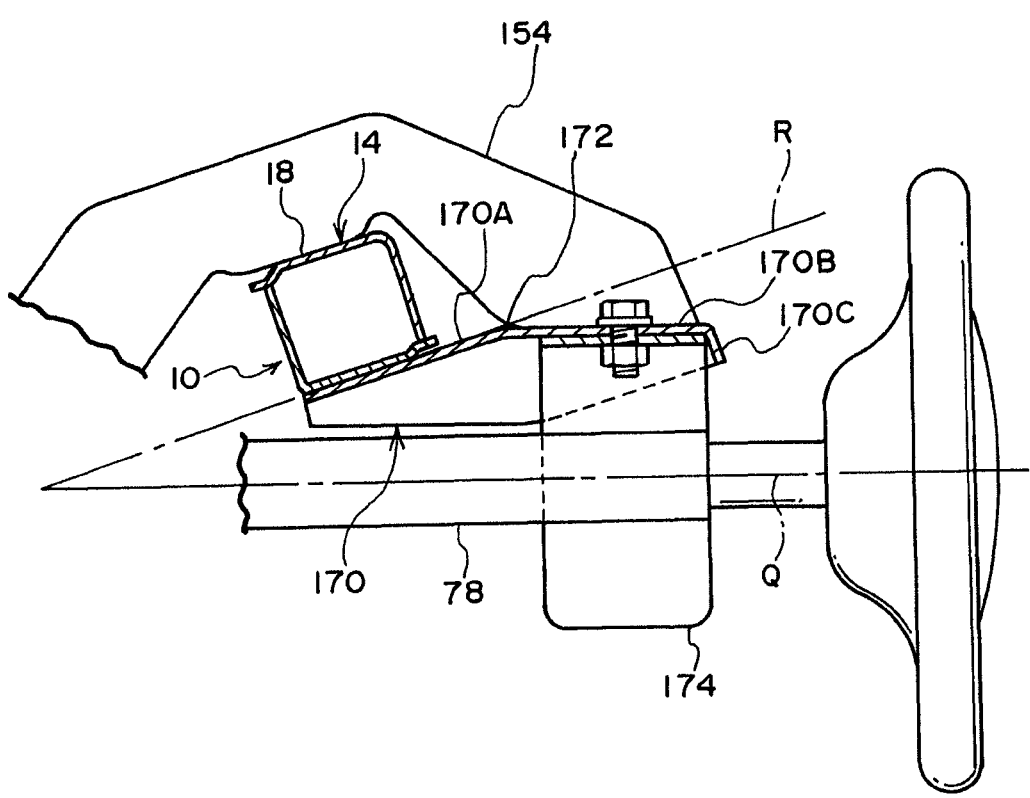
FIG. 11 is an explanatory diagram to explain an advantageous effect of a vehicle instrument panel reinforcement according to the present exemplary embodiment, and is a cross-section from the side in the region of a steering support bracket with a folded structure.
Figure 12:
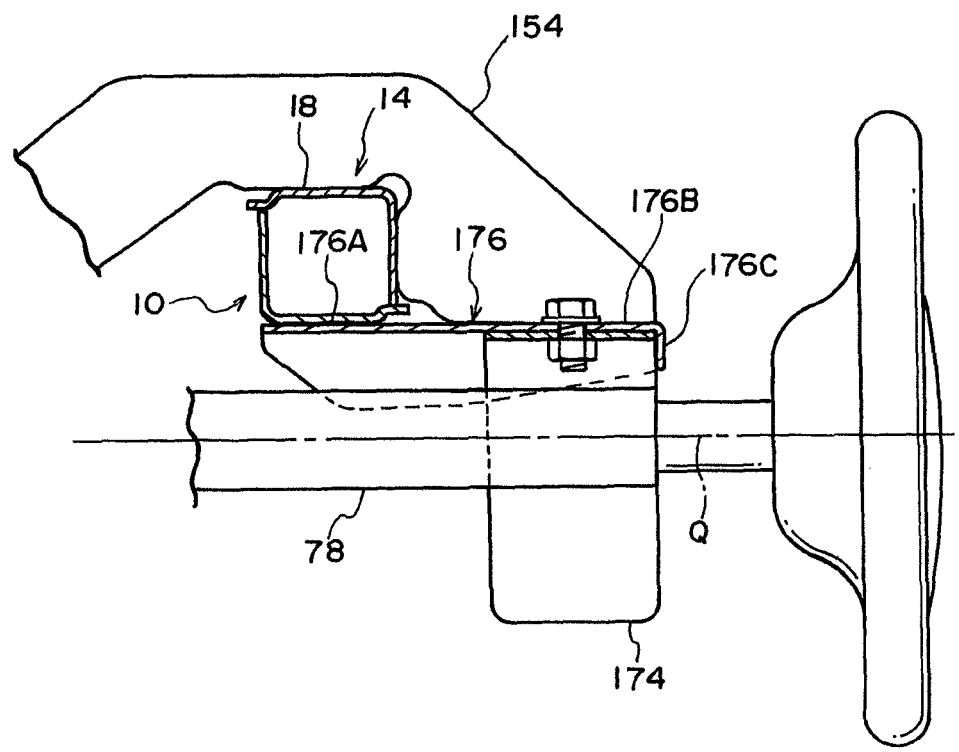
FIG. 12 is an explanatory diagram to explain an advantageous effect of a vehicle instrument panel reinforcement according to the present exemplary embodiment, and is a cross-section from the side in the region of a steering support bracket with a flat structure.
Figure 13:
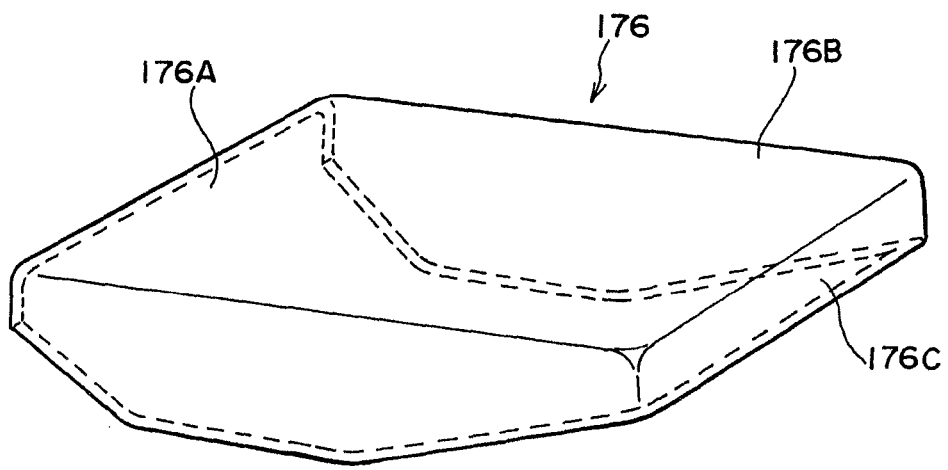
FIG. 13 is an enlarged perspective view of the steering support bracket illustrated in FIG. 12.

Moreover, suppose that the upper face section 18 of the upper member 14 of the instrument panel reinforcement 10 is not disposed substantially parallel to the axial line Q of the steering column 78 in vehicle side view, as illustrated in FIG. 11. Such a case would lead to a fold point 172 being formed between an attachment face 170A of a steering support bracket 170 to the instrument panel reinforcement 10 and an attachment face 170B of the steering support bracket 170 to the steering column 78. The profile of the steering support bracket 170 would consequently have a folded structure, and this element would make manufacture difficult. Moreover, in order to set the attachment face 170A during press forming, a rear end flange portion 170C is formed so as to project out in a perpendicular direction to a press face R. Consequently, since the rear end flange portion 170C is opened out with respect to the rear end face of a housing 174 of the steering column 78, the rigidity of the steering support bracket 170 is lowered. In contrast thereto, as illustrated in FIG. 12, the upper face section 18 of the upper member 14 of the instrument panel reinforcement 10 is disposed substantially parallel to the axial line Q of the steering column 78 in vehicle side view, without a fold point being formed between an attachment face 176A of a steering support bracket 176 to the instrument panel reinforcement 10 and an attachment face 176B of the steering support bracket 176 to the steering column 78. Thus both the attachment faces 176A, 176B can be disposed on a straight line. Consequently, as illustrated in FIG. 13, it is possible to manufacture the steering support bracket 176 with simple press forming. Moreover, a rear end flange portion 176C is formed in a perpendicular direction to the press face during press forming. The rigidity of the steering support bracket 176 is accordingly raised since the rear end flange portion 170C does not open out with respect to the rear end face of the housing 174 of the steering column 78.

Thus the vehicle instrument panel reinforcement according to the present exemplary embodiment enables the space utilization efficiency inside the instrument panel 138 to be raised, and enables easy manufacture and a reduction in cost to be achieved whilst still raising the rigidity of the steering support bracket.

Moreover, in the present exemplary embodiment, in vehicle side view, the upper face section 18 of the upper member 14 of the instrument panel reinforcement 10 is disposed substantially parallel to the assembly direction of the navigation instrument 142 or an audio device (the direction illustrated by the broken line P in FIG. 7), thereby enabling efficient utilization to be made of the constricted space inside the instrument panel 138. Namely, according to the present exemplary embodiment, the space utilization efficiency inside the instrument panel 138 can be raised.

Moreover, in the present exemplary embodiment, the upper member 14 that configures the instrument panel reinforcement 10 is disposed at the upper portion of the instrument panel reinforcement 10 as described above. Thus the wiring harness 146 is laid out on the rear face portion 20 of the upper member 14 at the driver seat side, and the wiring harness 146 is laid out on the upper face section 18 of the upper member 14 at the front passenger seat side. Namely, partway through layout from the driver seat side to the front passenger seat side, the wiring harness 146 overrides the connection location (corner portion) between the rear face portion 20 and the upper face section 18 of the upper member 14.

Thus in the present exemplary embodiment there is no flange or edge projecting out at the connection location between the rear face portion 20 and the upper face section 18 since the cross-section profile of the upper member 14 is formed in an L-shape. Thus the wiring harness 146 can suppress or prevent the wiring harness 146 from being damaged by the instrument panel reinforcement 10.

Moreover, in the present exemplary embodiment, the upper end portion 84A of the floor brace 84 and the upper end portion 86A of the steering brace 86 are fixed to the rear portion of the steering support bracket 52, and so up-down direction vibration of the steering column 78 occurring during travelling can be supported by axial force of the floor brace 84 and the steering brace 86. As a result, the strength (plate thickness) of the instrument panel reinforcement 10 can be lowered, enabling a reduction in vehicle weight and reduction in cost to be achieved.

Supplementary Explanation to the Exemplary Embodiment Described Above (1) In the above described exemplary embodiment, the instrument panel reinforcement 10 has the upper member 14 having an L-shaped cross-section in cross-section profile in cross-section taken in a direction orthogonal to the length direction is disposed at an upper portion of the square shaped cross-section, and the lower member 16 that is substantially L-shaped for the same cross-section profile is disposed at the lower portion of the square shaped cross-section. However the instrument panel reinforcement 10 is not limited thereto, and although the advantages are reduced, other cross-section structures may be employed. For example, the front-rear positional relationship between the upper member 14 and the lower member 16 may be reversed. Moreover, for example a closed cross-section profile may be configured with an upper member that ha a U-shaped cross-section profile opening downwards and a lower member with a flat plate shape that closes off the open end portions of the upper member (a square cross-section profile that is not divided into two along a diagonal).

(2) Multi-point simultaneous projection welding is performed in the exemplary embodiment described above, however it does not necessarily have to be simultaneous, and projection welding may be performed for the driver seat side first and then projection welding performed on the front passenger seat side.

(3) The recitation in the scope of the claims to "parallel" includes cases in which the two parts being compared are completely parallel to each other, and also cases in which the two parts being compared are not completely parallel to each other but however substantially obtain the advantageous effects of the present invention.

The invention claimed is:

1. A vehicle instrument panel reinforcement comprising:
an instrument panel reinforcement main body that is disposed along a vehicle width direction at the inside of a vehicle instrument panel, and that is formed by employing two members so as to have a cross-section profile of a square shaped closed cross-section profile, with a steering support bracket that supports a steering column fixed to the instrument panel reinforcement main body;
a first joint portion formed by projection welding together one end portion of one member configuring the two members and one end portion of the other member configuring the two members at a plurality of points simultaneously; and
a second joint portion formed by projection welding together another end portion of the one member configuring the two members and another end portion of the other member configuring the two members at a plurality of points simultaneously. wherein a welding pitch of the instrument panel reinforcement main body on a driver seat side is set narrower than a welding pitch of the instrument panel reinforcement main body on a front passenger seat side.

2. The vehicle instrument panel reinforcement of claim 1, wherein each of the two members is formed with an L-shaped cross-section profile, with the one member disposed at an upper portion of the instrument panel reinforcement main body and the other member disposed at a lower portion of the instrument panel reinforcement main body.

3. The vehicle instrument panel reinforcement of claim 2, wherein a wiring harness is laid out on a rear wall face of the instrument panel reinforcement main body at the driver seat side, and the wiring harness is laid out on an upper wall face of the instrument panel reinforcement main body on the front passenger seat side.

4. The vehicle instrument panel reinforcement of claim 1, wherein the instrument panel reinforcement main body is disposed such that an upper wall face of the instrument panel reinforcement main body slopes in vehicle side view so as to be parallel to an axial line of the steering column.

5. The vehicle instrument panel reinforcement of claim 1, wherein the instrument panel reinforcement main body is disposed such that an upper wall face of the instrument panel reinforcement main body slopes in vehicle side view so as to be parallel to an assembly direction of a navigation instrument or an audio device that is attached to the instrument panel.

6. The vehicle instrument panel reinforcement of claim 1, wherein an upper end portion of a brace member whose lower end portion is fixed to a vehicle floor or a lower portion of a front pillar is fixed to a rear portion of the steering support bracket.

* * * * *